Dec. 6, 1960 H. S. BURLING ET AL 2,962,898
TEMPERATURE CONTROLLING APPARATUS
Filed July 5, 1957 2 Sheets-Sheet 1
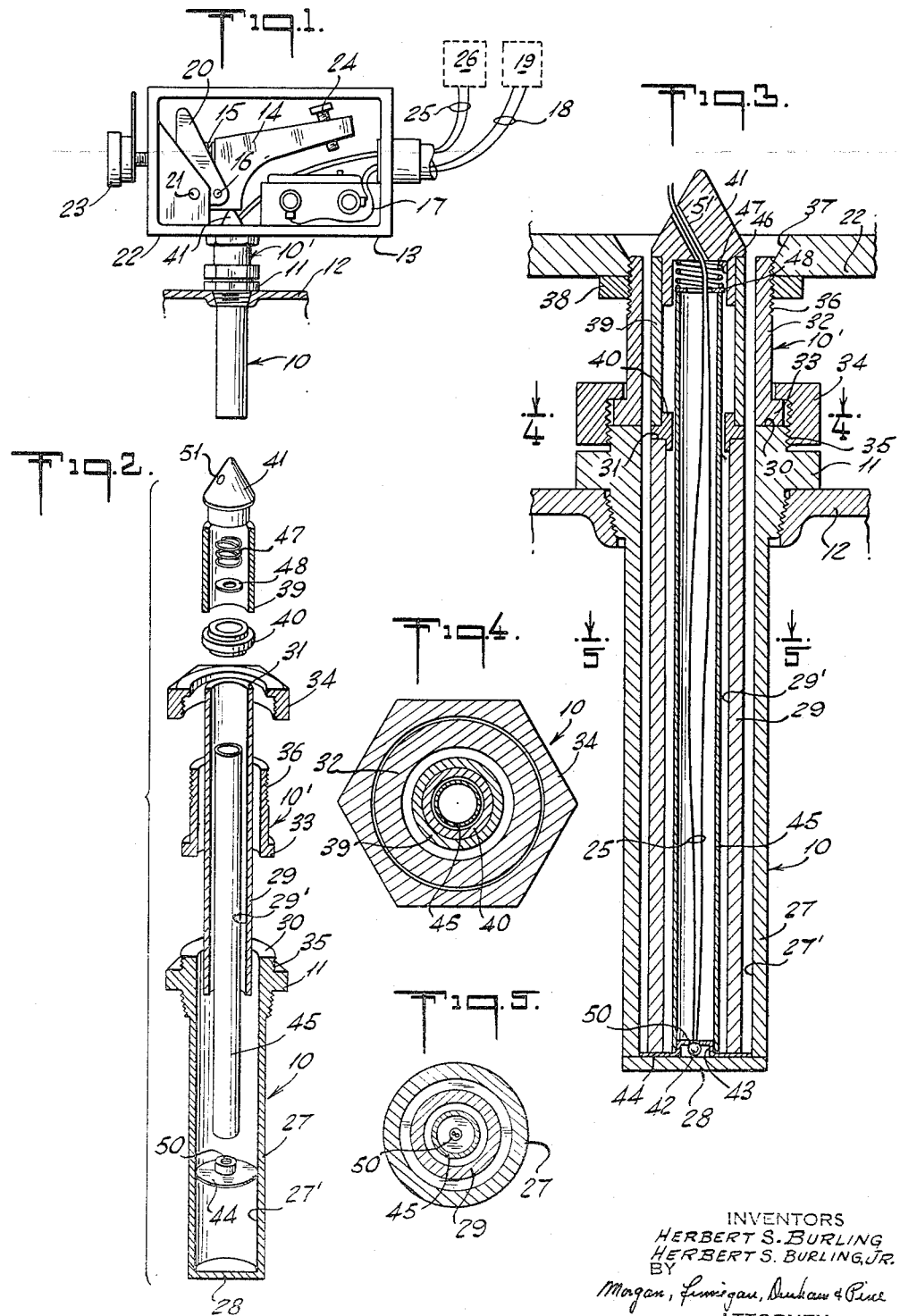
INVENTORS
HERBERT S. BURLING
HERBERT S. BURLING, JR.
BY
Morgan, Finnegan, Durham & Pine
ATTORNEY Dec. 6, 1960 H. S. BURLING ET AL 2,962,898
TEMPERATURE CONTROLLING APPARATUS
Filed July 5, 1957 2 Sheets-Sheet 2
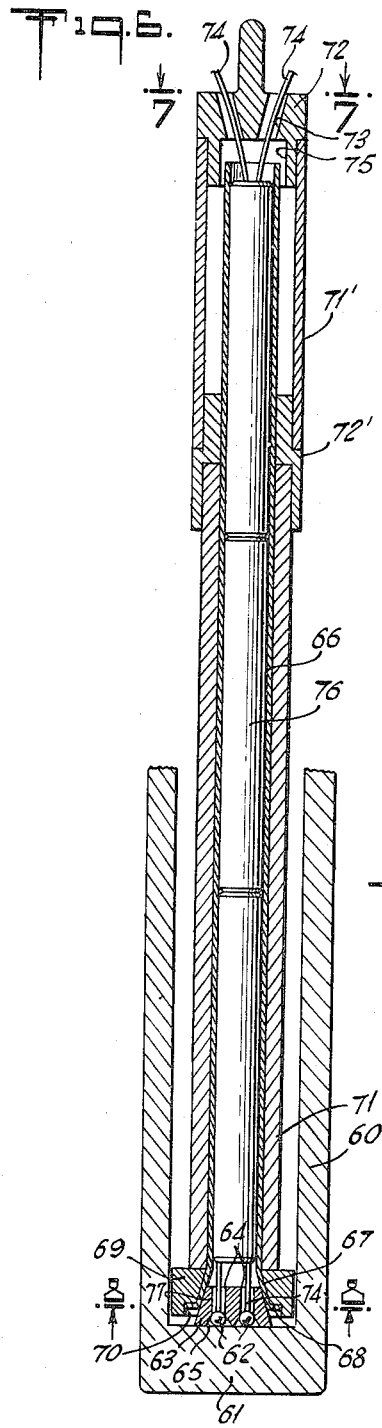
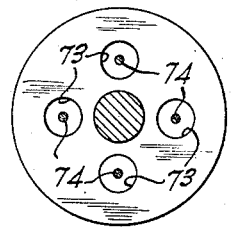
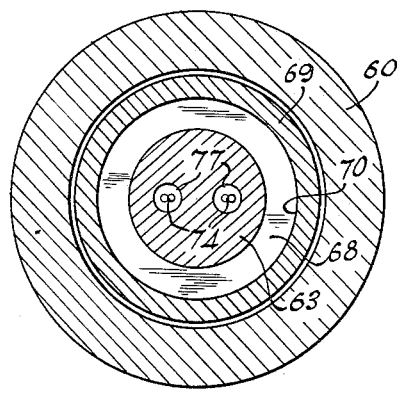
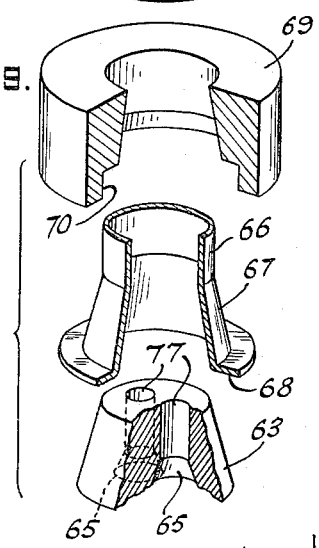
INVENTORS
HERBERT S. BURLING
HERBERT S. BURLING, JR.
BY
Mayan, Finnegan, Durham & Pine
ATTORNEYS 2,962,898
Patented Dec. 6, 1960

2,962,898
TEMPERATURE CONTROLLING APPARATUS

Herbert S. Burling, 308 Tillou Road, South Orange, N.J., and Herbert Sherman Burling, Jr., 28 Edgewood Road, Chatham, N.J.

Filed July 5, 1957, Ser. No. 670,137

13 Claims. (Cl. 73—362.3)

This invention relates to temperature sensing and controlling apparatus and more specifically to a novel and improved device embodying at least two temperature sensing means within a substantially unitary structure.

One object of the invention resides in the provision of a novel and improved arrangement of independent temperature sensing devices within a substantially unitary device that is characterized by its simplicity, dependability and ease of installation and maintenance.

Another object of the invention resides in the provision of an improved temperature responsive device having individual means for controlling temperature within a predetermined zone and for indicating the magnitude of the temperature being controlled that may serve for instance as an alarm should the temperature fall below or exceed predetermined values or ranges.

A further object of the invention resides in the provision of a novel and improved temperature sensing device embodying mechanical temperature sensing and responsive means and electrical means independent of the mechanical means and responsive to the temperature sensed by the mechanical means.

The above and other objects and advantages of the invention will become more apparent from the following description and accompanying drawings forming part of this application.

In the drawings:

Fig. 1 is a side elevational view in partial section of one embodiment of the invention;

Fig. 2 is an exploded perspective view of the temperature sensing apparatus of Fig. 1;

Fig. 3 is an enlarged cross sectional view of the assembled temperature sensing apparatus;

Figs. 4 and 5 are cross sectional views of Fig. 3 taken along the lines 4—4 and 5—5 thereof;

Fig. 6 is a cross sectional view of another embodiment of the invention;

Figs. 7 and 8 are cross sectional views of Fig. 6 taken along the lines 7—7 and 8—8 thereof; and Fig. 9 is an exploded perspective view of the elements shown in Fig. 8.

In temperature control systems and particularly those for use in connection with chemical and other similar processes it is often desirable to provide means for controlling the temperature of a particular step or steps in the process and at the same time provide a second independent temperature sensing device for sounding an alarm or producing other signals should the temperature exceed a predetermined maximum or fall below a predetermined minimum. With the embodiment of the invention illustrated in the drawings this can be attained with a compact unitary structure embodying two independent temperature sensing devices responsive to the temperature of the liquid or fluid being monitored or controlled. This overcomes the difficulty encountered with the utilization of two separate temperature measuring devices which require separate mounting means and may be subjected to different temperatures as it is often difficult to maintain the temperature of a liquid or fluid uniform throughout its volume. In many cases one temperature responsive device may indicate the attainment of an excessively high temperature whereas the controlling device may nevertheless be operating normally and satisfactorily. According to the invention one temperature responsive means is used to control or monitor the temperature of a fluid or liquid and a second responsive means monitors the temperature of the first responsive means.

Referring now to the drawings illustrating one embodiment of the invention, Fig. 1 illustrates a controller comprising an elongated temperature responsive device generally denoted by the numeral 10 and having mounting means 11 for securing it to the wall 12 of a container with the device 10 extending within the container itself. The outer end of the device 10 is provided with a connecting section 10' which in turn is coupled to a responsive mechanism generally denoted by the numeral 13. The temperature device 10, as will be shown, is responsive to temperatures within the container and operates to displace a lever 14 loaded by a spring 15 about its pivot 16. The lever 14 actuates a microswitch 17 that is connected by leads 18 to temperature control or monitoring apparatus generally noted by the numeral 19. In the illustrated structure the lever 14 is pivoted to a carrier 20 which in turn is pivoted at 21 to the frame 22 of the controller. An adjusting knob 23 threadably carried by the frame 22 bears against the carrier 20 to adjust the spring tension on the arm 14 and the arm 14 carries a switch adjusting screw 24.

In addition to the operation of the temperature responsive device 10 and the mechanism 13 for controlling the responsive apparatus 19, the invention further includes independent temperature responsive means enclosed within the element 10 and connected by leads 25 to responsive apparatus 26. In normal applications the responsive apparatus 19 is generally used to control the temperature of a fluid or liquid within a vessel while the responsive apparatus 26 may be arranged to sound an alarm if the temperature exceeds or falls below predetermined values.

Referring now to Figs. 2–5 illustrating the construction of the device 10 and the extension or coupling 10', the device 10 includes an outer tubular or cylindrical member 27 carrying the threaded mount 11 on its upper end for attachment to the wall 12 of the container. The lower end of the tubular member 27 is closed by a cap 28 that is welded or otherwise suitably fastened to the tubular member. If desired, the tubular member 27 may be machined from a single piece of material and the inner opening 27' formed by drilling the material so that the member 27 and the cap 28 constitute a unitary structure.

A second tubular member 29 is disposed within and axially aligned with the outer tubular member 27. In the instant embodiment of the invention this inner member is slightly shorter than the outer member and has a central opening 29' extending therethrough. The inner and outer members 29 and 27 constitute temperature responsive means and this is attained by fabricating these elements of materials having different temperature, coefficients of expansion. While these coefficients may be selected in any desired manner it is preferable to form the outer tubular member 27 of a material having a relatively high coefficient and form the member 29 of a material having a relatively low or even negative temperature coefficient. In this way the adjoining ends 30 and 31 of the members 27 and 29 respectively will shift their relative positions with changes in temperature.

The members 27 and 29 are coupled to the housing 22 of the responsive mechanism 13 by means of the coupling device 10' that is insensitive to temperature changes. This coupling device includes an outer cylindrical member 32 having a peripheral flange or collar 33 on the lower end thereof. This collar is engaged by a flanged nut 34 which threadably engages threads 35 on the mount 11 for holding the member 32 securely in engagement with the upper edge 30 of the tubular member 27. The upper end of the member 32 is provided with threads 36 for engaging the threaded opening 37 in the housing 22 and a lock nut 38.

The coupling 10' further includes an inner tubular member 39 having about the same outside diameter as the tubular member 29 and is held in alignment with the member 29 by an annular coupling member 40 having a generally T-shaped section. The upper end of the coupling member 39 includes a conical cap 41 which bears against the underside of the lever 14 as shown in Fig. 1. The pressure of the spring 15 on the lever 14 urges the latter downwardly against the cap 41 which in turn holds the members 29 and 39 in engagement one with the other and seats the member 29 tightly against the bottom cap or closure 28 on the lower end of the outer tubular member 27.

With this arrangement and with changes in temperature of the members 27 and 29 the cap 41 will be displaced relatively to the housing 22 and thus operate the lever 14 and the associated microswitch 17.

Inasmuch as the members 32 and 39 in this embodiment of the invention extend from the wall 12 they may be formed of materials having like temperature coefficients of expansion to neutralize temperature changes that may affect them.

A second temperature responsive device in the form of a thermocouple 42 is mounted within the temperature responsive member 10 to provide an independent sensing of the temperature of the outer cylindrical member 27 and its associated cap or closure 28. This is attained by holding the thermocouple 42 tightly against the bottom cap 28. In the instant embodiment of the invention the thermocouple 42 is protectively mounted within an inverted cup-like member 43 having an outwardly extending peripheral flange 44. The flange 44 has an outside diameter approximately equal to the inside diameter of the member 27 which automatically centers the cup 43 within the member 27. The cup 43 and the associated flange 44 is preferably made of a relatively thin material and the outer portion of the flange 44 is held in firm contact with the cap 28 by the pressure exerted on the inner member 29 as previously described. In order to hold the thermocouple against the cap 28 with the desired pressure the cup 43 may be made slightly shallower than the thermocouple 42 and the cup is urged downwardly by a relatively thin tube 45 disposed within the inner tubular member 29. The inside diameter of the tube 45 is approximately equal to the diameter of the cup 43 which thereby centers the lower end of the tube. The upper end of the tube 45 is received within an opening 46 in the cap 41 and is spring loaded downwardly by a spring 47 and a cooperating washer 48 disposed within the opening 46. With this arrangement and with the pressure of the lever 14 on the cap 41 the spring 47 applies sufficient pressure to the cup 43 to hold the thermocouple 42 in firm engagement with the lower cap 28 and this pressure is maintained substantially uniform notwithstanding changes in the length of the member 27 due to temperature variations.

The thermocouple 42 is coupled to an external indicator or alarm 26 by means of a pair of lead wires 25 which extend through an opening 50 in the cup 43 and an opening 51 in the cap 41.

With the foregoing arrangement a single unitary device having two independent temperature sensing means is provided that may be used for controlling the temperature of a surrounding gas or liquid and at the same time provide means for sounding an alarm in the event the first sensing element or its associated control system fails to operate properly. Inasmuch as the temperature is being sensed by two different elements at a single point variations in temperature that may be produced within the body of the liquid or fluid will not produce erratic indications that would otherwise result from the utilization of spaced temperature responsive means.

A modification of the invention, shown in Figs. 6–9, inclusive, illustrates another structure for holding the thermocouples in place within the concentric temperature responsive elements.

More specifically the outer tubular member 60 which corresponds to the tubular member 27 of Fig. 3 is preferably formed of a material having a high temperature coefficient and includes a bottom closure 61 preferably formed integrally with member 60. In this embodiment of the invention two thermocouples 62 are illustrated though it will be apparent that one or more thermocouples may be employed. The thermocouples are held against the base 61 by a conical member 63 having a pair of openings 64 therein. The lower ends of the opening 64 are countersunk as indicated at 65 and the side walls of member 63 slope inwardly toward the top. A central tube 66 is provided with a lower conical end 67 engaging the wall of the cone 63 and terminates in a peripheral flange 68. A collar 69 surrounds the conical end 67 of the tube 60 and has an annular recess 70 engaging the flange 68.

A second tubular member 71 is disposed between the tube 66 and the outer tubular member 60 and corresponds to the member 29 of Fig. 3. The lower end of the tubular member 71 as shown in Fig. 6 bears against the upper surface of the collar 69, and the pressure exerted by the responsive apparatus such as the device indicated at 13 of Fig. 1, presses the tubular member 71 against the collar 69 which locks both the tube 66 as well as the conical member 63 in place as illustrated.

As in the case of the tubular member 29 of Fig. 3 the tubular member member 66 of Fig. 6 is preferably formed of a material having a relatively low temperature coefficient of expansion.

The upper end of the tubular member 71 is coupled to a cap 72 which corresponds to the cap 41 of Fig. 3, by means of a tubular extension 71' joined to the inner member 71 by means of a coupling 72'. The member 71' corresponds to the tubular extension 39 as shown in Fig. 3. The cap 72 is substantially identical to the cap 41 and includes openings 73 through which the thermocouple leads 74 extend. The underside of the cap 72 includes a recess 75 for reception of the upper end of the tube 66. Inasmuch as the tube 66 is held in position by the collar 69 and the pressure exerted on the cap 72, a spring between the tube 66 and the cap 72 corresponding to the spring 47 of Fig. 3 is not necessary.

While not shown in this figure, the outer tubular member 60 carries on its upper end an annular connector corresponding to the connector 11 of Fig. 3 and a tubular coupling member corresponding to the member 32 of Fig. 3 for the attachment of the unit to a device such as that shown at 13 of Fig. 1. In addition, the embodiment of the invention shown in Fig. 6 further includes a plurality of elongated insulating members 76 disposed within the tube 66 and having one or more openings 77 therein for receiving the thermocouple leads 74.

While only certain embodiments of the invention have been illustrated and described it is apparent that modifications, alterations and changes may be made without departing from the true scope and spirit of the invention as defined by the appended claims.

What is claimed is:

1. Temperature sensing and controlling apparatus comprising an elongated temperature sensing element including an outer tubular member of a material having one temperature coefficient of expansion, an inner tubular member of a material having another temperature coefficient of expansion and substantially coextensive with the outer member, means at least partially closing one end of said outer member, means connected to the other end of said outer member and the adjoining end of said inner member and responsive to the relative movement therebetween, a second temperature sensing element independent of said members and carried by and adjoining said one end of said members, and means extending through said inner member for coupling said second element with a responsive device.

2. A temperature responsive device according to claim 1 wherein said second element is a thermocouple and includes a pair of lead wires extending through said inner member and insulated from both said members.

3. A temperature responsive device comprising an outer tubular member of a material having one temperature coefficient of expansion, an inner tubular member of a material having another temperature coefficient of expansion, a third tubular member slidably disposed within said inner member, means at least partially closing one end of said outer tubular member, responsive means coupled to the other end of said outer member and the adjoining end of the inner tubular member, said responsive means urging the inner tubular member against said closure means, a thermocouple within and adjoining said one end of said inner member, means cooperating with said inner member for holding said third member and said thermocouple snugly against said end closure.

4. A temperature responsive device according to claim 3 wherein said last mentioned means comprises an inverted flanged cup-like member for receiving said thermocouple and said third member engages said flange to hold the thermocouple against said end closure.

5. A temperature responsive device according to claim 3 wherein a second set of outer and inner tubular members having like coefficients of expansion are interposed between the responsive means and the first set of outer and inner members and said device further includes annular mounting means surrounding the juncture of said first and second sets of tubular members.

6. A temperature responsive device comprising an elongated outer tubular member formed of a material having one coefficient of expansion, annular mounting means about one end of said member and means at least partly closing the other end of said member, an inverted cup-like member having a peripheral flange resting on said closure means, an inner tubular member within the first said member and formed of a material having another coefficient of expansion, said members being of substantially equal lengths, a second outer tubular member removably secured to said one end of the first outer member, a second inner tubular member extending from and held in alignment with the first said inner member, said second outer and inner tubular members being formed of materials having like coefficients of expansion, a cap closing the outer end of said second inner tubular member, responsive means carried by said second outer member and having a spring loaded lever bearing against said cap, a thermocouple within said cup-like member, a tubular element disposed within said inner tubular members and having one end in engagement with the flanged rim of said cup-like member and the other end spaced from said cap, and spring means between said tubular element and said cap to urge the cup-like member and thermocouple against said closure means, and wires on said thermocouple extending through said cup-like member, said tubular element and said cap.

7. A temperature responsive device comprising an outer elongated tubular member closed at one end and formed of a material having one temperature coefficient of expansion, a conical member having at least one opening extending therethrough seated within said tubular member and with the larger end against said closed end, an elongated tube within said tubular member, a flared end portion on said tube engaging said conical member, a collar having a conical opening therein engaging the outer surface of the conical end portion of said tube, a second tubular member of another temperature coefficient of expansion surrounding said tube and bearing against said collar, spring loaded responsive means connected between the outer ends of the first and second tubular members urging the latter toward said closed end to hold the conical member firmly against said closed end and a temperature responsive device within the opening in said conical member.

8. A temperature responsive device comprising at least two concentric and substantially coextensive elements formed of materials having different temperature coefficients of expansion, means closing one end of the outer concentric member, spring loaded means coupled to the other ends of said elements and urging the inner element against the closed end of the outer element, an electrical temperature responsive element on the inner surface of said closed end and means engaging said electrical element and said inner concentric element, the pressure exerted on said inner concentric element holding the last said means and said electrical element in place.

9. A temperature responsive device comprising at least two concentric and substantially co-extensive elements formed of materials having different temperature coefficients of expansion, means closing one end of the outer concentric member, spring loaded means coupled to the other ends of said elements and urging the inner element against the closed end of the outer element, an electrical temperature responsive element on the inner surface of said closed end and means engaging said inner element for holding said electrical element in place wherein the last said means includes a truncated cone having an opening therein for holding the electrical element, and a surrounding collar engaging the outer surface of said cone, said inner element bearing against said collar to hold the collar and cone in place against said closed end.

10. A temperature responsive device comprising an outer tubular member having a closed end and formed of material having one temperature coefficient of expansion, an inner tubular member of a material having another temperature coefficient of expansion, a thermocouple seated against said closed end and having a pair of wires extending outwardly of said outer tubular member, thermo-couple supporting means surrounding the thermo-couple and seated against said closed end, a third tubular member within said inner tubular member with one end in engagement with said supporting means, a collar surrounding said one end of the third tubular member and in engagement with the inner tubular member for holding the third tubular member and the thermocouple supporting means in position in said outer tubular member and means connected between the inner and outer tubular members for urging the inner tubular member inwardly of said outer tubular member and responsive to changes in temperature of said inner and outer members.

11. A temperature responsive device according to claim 11 wherein said thermo-couple supporting means is in the form of a truncated cone with the larger diameter end seated against said closed end, said one end of the third tubular member includes a conical portion terminating in an outwardly extending flange and engaging said conical thermo-couple supporting member and said collar is a tubular member having a tapered opening extending therethrough, said opening at the larger end thereof terminating in a peripheral shoulder having a diameter that will receive said outwardly extending flange, said collar engaging the conical end portion on the third tubular member and the inner end of the said inner tubular member and responsive to pressure applied to said inner tubular member to hold the third tubular member and said thermo-couple supporting member in position against said closed end.

12. A temperature responsive device comprising an outer tubular member having a closed end and formed of material having one temperature coefficient of expansion, an inner tubular member of a material having another temperature coefficient of expansion, a thermo-couple seated against the closed end and having a pair of wires extending outward of said outer tubular member, thermo-couple supporting means having an opening accommodating said wires and overlying the thermo-couple, a third tubular member within said inner tubular member with one end having a peripheral flange in engagement with said supporting means, a collar surrounding said one end of the third tubular member and in engagement with said flange, and with said inner tubular member for holding the third tubular member and the thermo-couple supporting means in a position in said outer tubular member and means connected between the inner and outer tubular members for urging the inner tubular member inwardly of said outer tubular member and responsive to changes in temperature of said inner and outer members.

13. A temperature responsive device according to claim 12 wherein said collar includes a recess in one end thereof for receiving said flange and said thermo-couple supporting means.

References Cited in the file of this patent

UNITED STATES PATENTS

| | | |
|---|---|---|
| 1,156,317 | Santos et al. | Oct. 12, 1915 |
| 2,104,749 | Jones | Jan. 11, 1938 |
| 2,152,153 | Ridgway | Mar. 28, 1939 |
| 2,232,961 | Milnes | Feb. 25, 1941 |
| 2,705,747 | Strange | Apr. 5, 1955 |